(12) United States Patent
Ash et al.

(10) Patent No.: US 7,680,982 B2
(45) Date of Patent: Mar. 16, 2010

(54) PRESERVATION OF CACHE DATA FOLLOWING FAILOVER

(75) Inventors: Kevin John Ash, Tucson, AZ (US); Lokesh Mohan Gupta, Tucson, AZ (US); Steven Robert Lowe, Tucson, AZ (US); Alfred Emilio Sanchez, Tucson, AZ (US); Kenneth Wayne Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 11/676,634

(22) Filed: Feb. 20, 2007

(65) Prior Publication Data

US 2008/0201523 A1    Aug. 21, 2008

(51) Int. Cl.
*G06F 12/00*    (2006.01)
(52) U.S. Cl. .............. 711/113; 711/154; 711/158; 711/162; 711/165; 707/204; 714/5; 714/6
(58) Field of Classification Search ............... 711/113, 711/154, 158, 162, 165; 707/204; 714/5, 714/6
See application file for complete search history.

(56) References Cited

U.S. PATENT DOCUMENTS

| 4,916,605 | A | * | 4/1990 | Beardsley et al. | ........... | 711/162 |
|---|---|---|---|---|---|---|
| 5,329,622 | A | * | 7/1994 | Belsan et al. | ............... | 711/113 |
| 5,437,022 | A | | 7/1995 | Beardsley | ....................... | 714/6 |
| 5,636,359 | A | | 6/1997 | Beardsley | ................... | 711/122 |
| 5,771,367 | A | | 6/1998 | Beardsley | ................... | 711/162 |
| 6,006,342 | A | | 12/1999 | Beardsley et al. | .............. | 714/5 |
| 6,996,690 | B2 | | 2/2006 | Nakamura et al. | .......... | 711/162 |
| 7,085,886 | B2 | | 8/2006 | Hsu et al. | ................... | 711/120 |
| 7,085,907 | B2 | | 8/2006 | Ash et al. | ................... | 711/170 |
| 2004/0059870 | A1 | | 3/2004 | Ash | ........................... | 711/119 |
| 2005/0193242 | A1 | | 9/2005 | Ash et al. | ...................... | 714/8 |
| 2005/0240809 | A1 | | 10/2005 | Ash et al. | ...................... | 714/8 |

* cited by examiner

*Primary Examiner*—Stephen C Elmore
(74) *Attorney, Agent, or Firm*—John H. Holcombe

(57) ABSTRACT

In a data storage subsystem with disk storage and a pair of clusters, one set of DASD fast write data is in cache of one cluster and in non-volatile data storage of the other. In response to a failover of one of the pair of clusters to a local cluster, the local cluster converts the DASD fast write data in local cache to converted fast write data to prioritize the converted data for destaging to disk storage. In response to failure to destage, the local cluster allocates local non-volatile storage tracks and emulates a host adapter to store the converted fast write data by the local non-volatile storage, reconverting the converted fast write data of the non-volatile storage to local DASD fast write data stored in the local non-volatile storage and stored in the local cache storage.

30 Claims, 6 Drawing Sheets

PRESERVATION OF CACHE DATA FOLLOWING FAILOVER

FIELD OF THE INVENTION

This invention relates to the field of data storage subsystems, and, more particularly, to managing the preservation of data in the event of failover from one of a pair of clusters to the local cluster.

BACKGROUND OF THE INVENTION

Data storage subsystems may comprise various forms of data storage to initially store data, such as DASD fast write data from host systems, and subsequently to destage the data to more permanent data storage, such as DASD or disk drives. In one example, the data storage subsystem may comprise a pair of clusters, each with cache data storage which is volatile, and non-volatile data storage. The pair of clusters provide backup to the data in that one set of dual mode DASD fast write data of a logical subsystem is stored in the cache data storage of a first cluster and in the non-volatile data storage of the second cluster, and dual mode DASD fast write data of another logical subsystem is stored in the cache data storage of the second cluster and in the non-volatile data storage of the first cluster. As an example, in dual cluster mode, even logical subsystems use the cache in the left cluster and the non-volatile storage in the right, and odd logical subsystems use the cache in the right cluster and the non-volatile storage in the left.

As the result, all of the dual mode DASD fast write data is protected, for example against a power failure or reboot event, by being stored in a non-volatile store in one of the clusters.

In the event of a failure of one of the clusters, a failover is executed to the other cluster, and all of the dual mode DASD fast write data is available on the other cluster, with one set of data stored in the non-volatile data storage and another set of data stored in the cache data storage.

Thus, in response to a failover of one of the pair of clusters to the local cluster, the dual mode DASD fast write data that is stored in local cache storage and that was known to be stored in non-volatile storage in the other cluster, becomes the only copy of the data. The cache data storage is volatile, leaving the only copy of the data vulnerable.

SUMMARY OF THE INVENTION

Data storage subsystems, clusters of data storage subsystems, computer program products and methods are provided for storing data with respect to at least one host adapter, wherein there may be a failover of one of a pair of clusters.

An embodiment of a data storage subsystem comprises disk storage configured to store data; and a pair of clusters. A cluster comprises local non-volatile data storage; local cache data storage; and subsystem control configured to store DASD fast write data of a logical subsystem in the local non-volatile data storage and DASD fast write data of another logical subsystem in the local cache data storage.

In one embodiment, in response to a failover of one of the pair of clusters to a local cluster, the local cluster converts the local cache storage dual mode DASD fast write data to converted fast write data, and gives priority to the converted fast write data over other fast write data for destaging the data to disk storage.

In a further embodiment, wherein the subsystem control of a cluster is embodied as non-volatile storage control and cache control, the cache control creates a new list for the failover converted fast write data, such that the converted fast write data is to be processed with priority for destaging to the disk storage.

In a still further embodiment, wherein the subsystem control of a cluster additionally is configured to store in the local non-volatile storage, track ID entries of the dual mode DASD fast write data of another logical subsystem stored in the local cache data storage. In response to the failover of one of the pair of clusters to a local cluster, the subsystem control is configured to convert the track ID entries of the dual mode DASD fast write data of the failed cluster to local track ID entries of the data, thereby converting the local cache storage dual mode DASD fast write data to converted fast write data; and to add the changed track IDs to the new list.

In another embodiment, the data storage subsystem is configured to store data with respect to at least one host adapter, and comprises disk storage configured to store data, and a pair of clusters. A cluster comprises local non-volatile data storage, local cache data storage, and subsystem control configured to store dual mode DASD fast write data of a logical subsystem in the local non-volatile data storage and dual mode DASD fast write data of another logical subsystem in the local cache data storage. In response to a failover of one of the pair of clusters to a local cluster, the cluster is configured to convert the local cache storage dual mode DASD fast write data to converted fast write data and to attempt to destage data from the local cache data storage to the disk storage, and, in response to failure to destage the converted fast write data to the disk storage, to allocate local non-volatile storage tracks and emulate a host adapter to provide the converted fast write data of the local cache data storage to the local non-volatile storage for storage by the local non-volatile storage, reconverting the converted fast write data of the local cache data storage to local single mode DASD fast write data stored in the local non-volatile storage and stored in the local cache storage.

In a further embodiment, the subsystem control of each cluster is configured to send a host adapter style commit message to the local non-volatile storage to commit the provided converted fast write data.

In a still further embodiment, the subsystem control of a cluster is configured to store in the local non-volatile storage, track ID entries of fast write data stored in the local cache data storage; and is additionally configured, in response to a commit acknowledge from the local non-volatile store to the host adapter style commit message, to remove the cache track ID entry from the local non-volatile store for the converted fast write data that has been committed.

In a further embodiment, the subsystem control of a cluster adds the DASD fast write data reconverted from the converted fast write data to a DFW list to be destaged to the disk storage.

In another embodiment, the subsystem control of a cluster is embodied as non-volatile storage control, cache control and retro-store control. "Retro-store control" is a control or control code that emulates a host adapter. The cache control calls the non-volatile storage control to allocate non-volatile storage segments for write; and the retro-store control emulates the host adapter to copy the converted fast write data to the non-volatile storage segments.

For a fuller understanding of the present invention, reference should be made to the following detailed description taken in conjunction with the accompanying drawings.

DETAILED DESCRIPTION OF THE INVENTION

This invention is described in preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
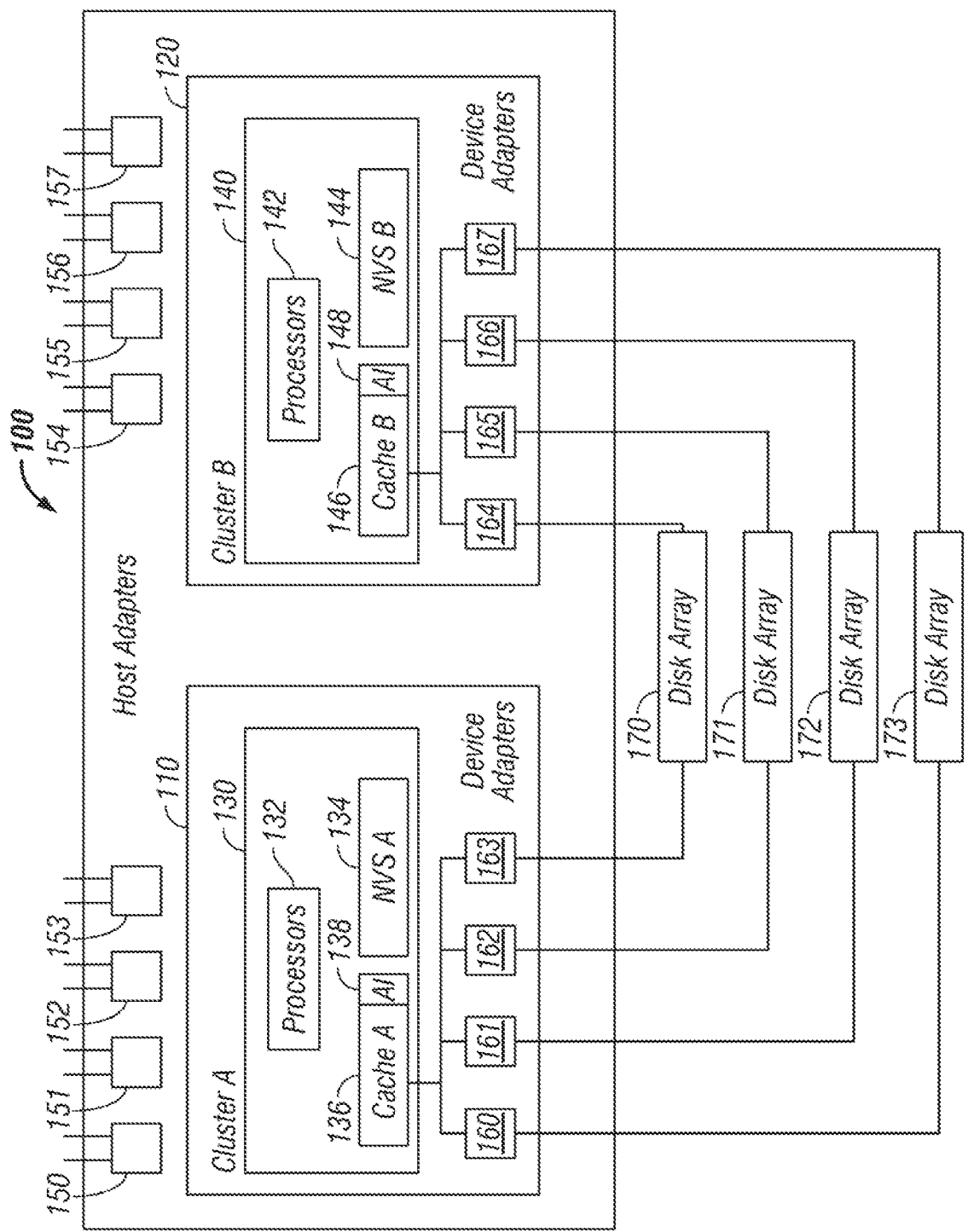
FIG. 1 is a block diagram illustrating a data storage subsystem which may implement embodiments of the present invention.

Referring to FIG. 1, a data storage subsystem 100 comprises a cluster 110 and another cluster 120. Cluster 110 comprises a complex 130 embodying at least subsystem control 132, a local non-volatile data storage 134, and local cache data storage 136. Similarly, cluster 120 comprises a complex 140 embodying at least subsystem control 142, a local non-volatile data storage 144, and local cache data storage 146. In each cluster, the subsystem control may be wholly separate from the remainder of the complex, or may be partially embodied by the local non-volatile data storage and/or local cache data storage. The subsystem control 132, 142 comprises logic and/or one or more microprocessors with memory for storing information and program information for operating the microprocessor(s). Herein "processor" or "control" may comprise any suitable logic, programmable logic, microprocessor, and associated or internal memory for responding to program instructions, and the associated or internal memory may comprise fixed or rewritable memory or data storage devices. The program information may be supplied to the subsystem control or memory from a host or via a data storage drive or disk array, or by an input from a floppy or optical disk, or by being read from a cartridge, or by any other suitable means. The program information thus may comprise one or more program products comprising a computer useable medium having computer usable program code tangibly embodied therein for operating the cluster 110 and/or for operating the cluster 120, or similar types of systems or devices.

The non-volatile data storage 134, 144 may comprise a memory system having a batter backup that protects data even if power is lost, flash PROM, disk drive, or other suitable non-volatile memory, as are known to those of skill in the art. Cache data storage 136, 146 may comprise any suitable memory system and may be volatile, potentially losing data after power is removed, as is known to those of skill in the art.

An adapter interface (A1) 138, 148 may comprise part of the cache data storage 136, 146, and/or may comprise part of the subsystem control 132, 142, and may reside at the cache data storage 136, 146, or may reside separately or with other elements of the complex 130, 140. An adapter interface provides logic for handling aspects of the data transfer with respect to the local non-volatile data storage and the cache data storage for the specific cluster, as is known to those of skill in the art.

A plurality of host adapters 150-157 may comprise one or more Fibre Channel ports, one or more FICON ports, one or more ESCON ports, one or more SCSI ports, or other suitable ports, all as are known to those of skill in the art. Each host adapter is configured to communicate with a host system and to both cluster 110 and cluster 120 such that each cluster can handle I/O from any host adapter.

A plurality of device adapters 160-167 may comprise communication links for communication with disk drives or disk drive systems, such as disk arrays 170-173. Alternatively, magnetic tape drives may substitute for one or more of the disk arrays. The disk arrays may utilize RAID (Redundant Array of Independent Disks) protocols, or may comprise JBOD (Just a Bunch of Disks) arrays. The communication links may comprise serial interconnections, such as RS-232 or RS-422, Ethernet connections, SCSI interconnections, ESCON interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

An example of a data storage subsystem 100 comprises am IBM® Enterprise Storage Server, Model DS/8000, or other comparable system.

As discussed above, data storage subsystems may comprise various forms of data storage to store data from host systems.

Figure 2:
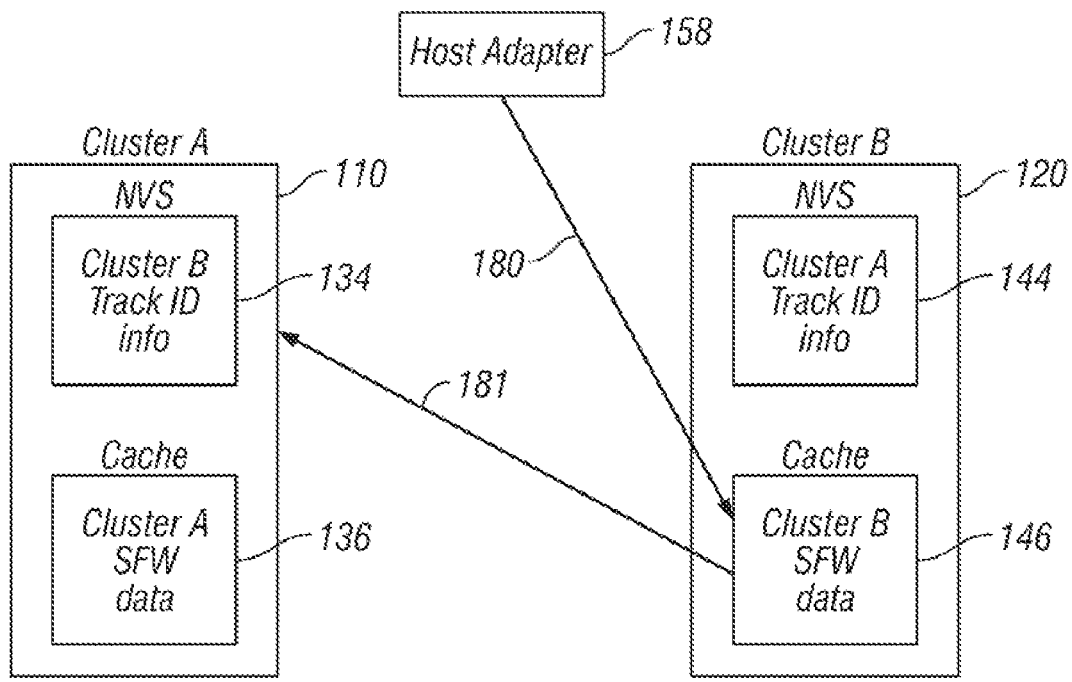
FIG. 2 is a diagrammatic illustration of prior art temporary storage of a type of data stored by the data storage subsystem of FIG. 1, which may be termed sequential fast write data.

Referring to FIGS. 1 and 2, one type of host data is sequential fast write (SFW) data that is stored by the data storage subsystem 100 while there is an original copy at some other point in the system. For example, if data is stored at a primary site to be copied to the disk array 170-173 of the data storage subsystem as a secondary site, the data is sent during a "PPRC Establish" (Peer-to-Peer Remote Copy) from the primary control to the secondary site to arrive via the host adapter 158 as SFW data. Host adapter 158 is illustrated as a proxy for any or more than one of the host adapters 150-157. This data is only sent to the cache data storage 136, 146, and not to the non-volatile storage 134, 144. A track ID (identification) entry is placed into the non-volatile storage 134, 144 for each track. This entry is needed in case a reboot action occurs which causes loss of the cache information. The data can then be re-established correctly in the cache storage when received again from the primary control. In the example, SFW data is stored by the host adapter 158 in cache data storage 146 of cluster 120 in step 180, and the cache stores the track ID entries in non-volatile storage 134 of cluster 110 in step 181. Once all the data has been copied from the primary to the secondary, all further writes to the secondary arrive as DASD fast write (DFW) data. In the event of a failover of one cluster to a local cluster, the track ID entries in the non-volatile storage of the local cluster are employed to reaccess the SFW data of the failed cluster.

Figure 3:
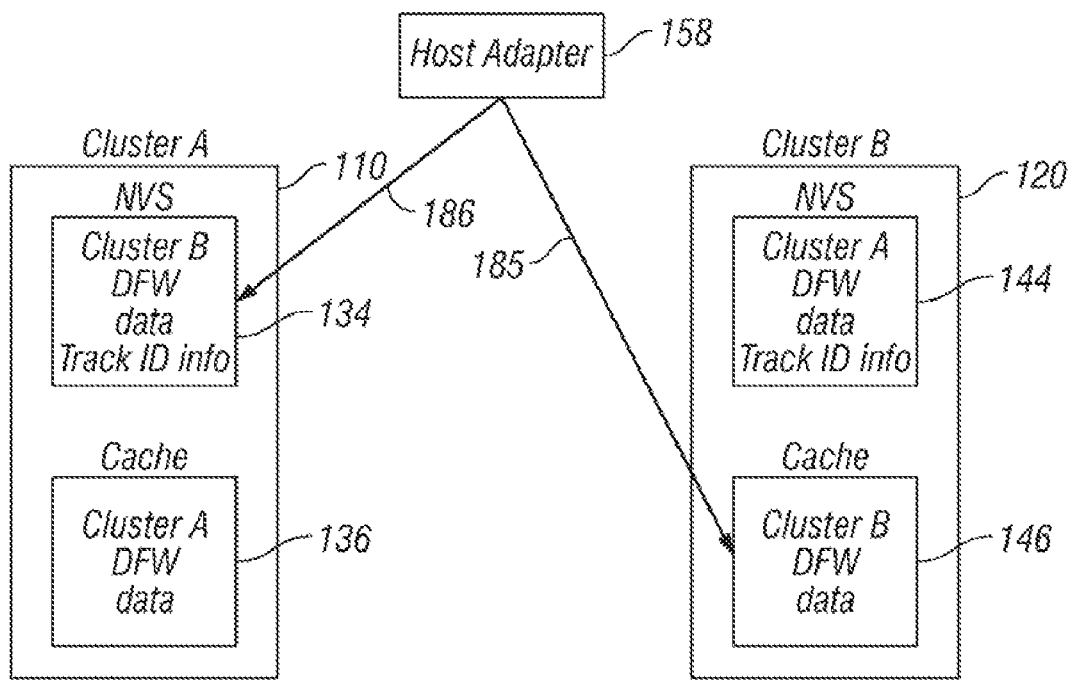
FIG. 3 is a diagrammatic illustration of prior art temporary storage of another type of data stored by the data storage subsystem of FIG. 1, which may be termed DASD fast write data.

Referring to FIGS. 1 and 3, another type of host data is DASD fast write (DFW) data which is initially stored by the clusters 110 and 120 from host systems via 158, and subsequently destaged to more permanent data storage, such as DASD or disk drives 170-173. The pair of clusters 110 and cluster 120 provide backup to the data in that one set of dual mode DASD fast write data of a logical subsystem is stored in the cache data storage 136 of a first cluster and in the non-volatile data storage 144 of the second cluster, and dual mode DASD fast write data of another logical subsystem is stored in the cache data storage 146 of the second cluster and in the non-volatile data storage 134 of the first cluster. As an example, in dual cluster mode, even logical subsystems use the cache in the left cluster and the non-volatile storage in the right, and odd logical subsystems use the cache in the right cluster and the non-volatile storage in the left. In addition, the cache track ID entries are stored in the non-volatile storage of the other cluster. In the example, DFW data is stored by the host adapter 158 in cache data storage 146 of cluster 120 in step 185, and in non-volatile storage 134 of cluster 110 in step 186. Additionally, the cache 146 of the cluster 120 stores the cache track ID entries in non-volatile storage 134 of cluster 110.

As the result, all of the dual mode DASD fast write data is protected, for example against a power failure or reboot event, by being stored in a non-volatile store in one of the clusters.

Figure 4:
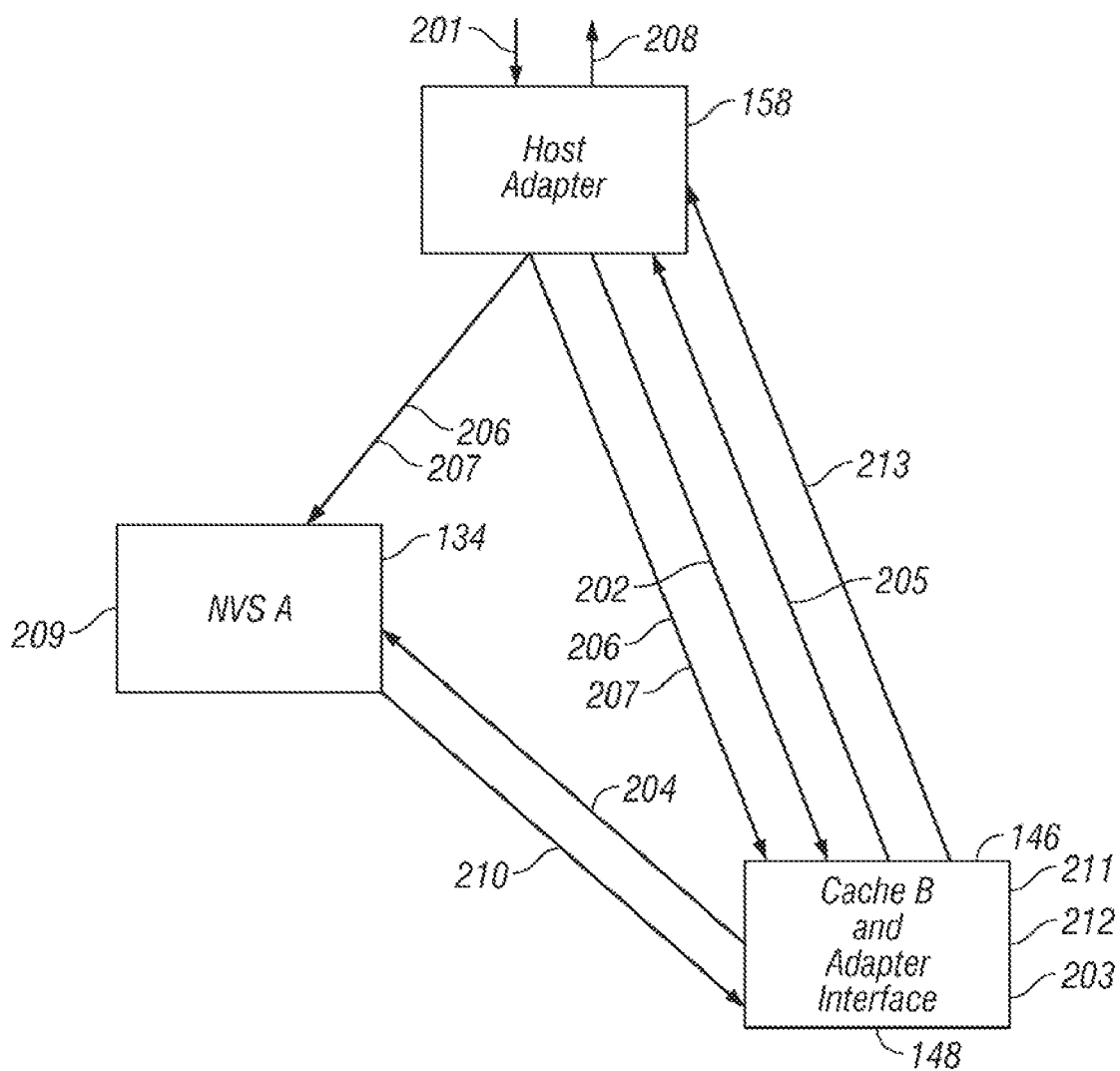
FIG. 4 is a diagrammatic illustration of a prior art process for receiving DASD fast write data of FIG. 3 and temporarily storing that data.

FIG. 4 illustrates an example of prior art detailed process for storing dual mode DASD fast write data for subsequent destaging.

Referring to FIGS. 1, 3, and 4, in step 201, the host adapter 158 gets a write request for a track, and, in step 202, sends mail to the adapter interface 148 of the cache for cluster "B" 146 with a track ID to allocate cache and non-volatile storage (NVS) segments and a non-volatile storage buffer. In step 203, the adapter interface 148 calls the cache 146 to allocate cache/NVS segments and creates cache control block. The adapter interface also allocates a NVS track buffer. In step 204, the adapter interface builds and sends a track control block to the NVS for cluster "A" 134 to indicate the segments to use. In step 205, the adapter interface sends mail to the host adapter with the NVS track buffer number to start the write. In step 206, the host adapter 158 uses a DMA function (direct memory access) to send data to the cache segments and the NVS track buffer, and, in step 207 (same arrow), sends mail to the cache to commit the data and sends mail to the NVS with the track buffer number used to commit the data. In step 208, the host adapter gives a device end to the host system indicating write complete. The write complete is supported by the fact that the NVS 134 will commit the data even after a power loss to the cluster. In step 209, the NVS 134 sees the mail 207, and then commits data by building an NVS control block for the track and moving data from the track buffer to the NVS segments, and, in step 210, the NVS sends a commit complete mail to the adapter interface 148. In step 211, the adapter interface sees the "complete" mail from both the host adapter and the NVS, and, in step 212, calls the cache 146 to update the cache control block with the segments written in both cache and NVS and frees the NVS track buffer. In step 213, the adapter interface sends a write complete message to the host adapter 158. Thus, the host adapter knows that the device end of step 208 is fully supported, and the dual mode DASD fast write data is written and stored to both the NVS 134 of cluster "A" and the cache 146 of cluster "B". Other detailed sequences may be employed to accomplish the storage of the dual mode DASD fast write data for subsequent destaging. The cache 146 of cluster "B" also comprises half of the dual mode sequential fast write (SFW) data of the data storage subsystem, as discussed above.

In one example, dual mode DASD fast write data from odd-numbered logical subsystems is stored in the NVS 134 of cluster "A" and dual mode DASD fast write data and dual mode sequential fast write data from odd-numbered logical subsystems (discussed above) are both stored in the cache 146 of cluster "B". Similarly, dual mode DASD fast write data from even-numbered logical subsystems is stored in the NVS 144 of cluster "B" and dual mode DASD fast write data and dual mode sequential fast write data from even-numbered logical subsystems are both stored in the cache 136 of cluster "A".

The cache 136, 146 is typically less expensive per amount of data stored than the non-volatile storage 134, 144, and therefore is provided in much greater capacity to handle both the sequential fast write data and the DASD fast write data.

In the event of a failover of one of the clusters to the other cluster, all of the dual mode DASD fast write data is available on the other cluster, with one set of dual mode DASD fast write data stored in the non-volatile data storage and another set of data stored in the cache data storage together with other fast write data, such as the sequential fast write data.

As the result of the failover, the dual mode DASD fast write data that is stored in local cache storage and that was known to have been stored in non-volatile storage in the other cluster, becomes the only copy of the data. The cache data storage is volatile, leaving the only copy of the DASD fast write data, and the other fast write data, vulnerable. Typically, data that is in cache data storage is therefore destaged to the more permanent storage, such as disk storage 170-173 to protect the data.

Figures 5, 6:
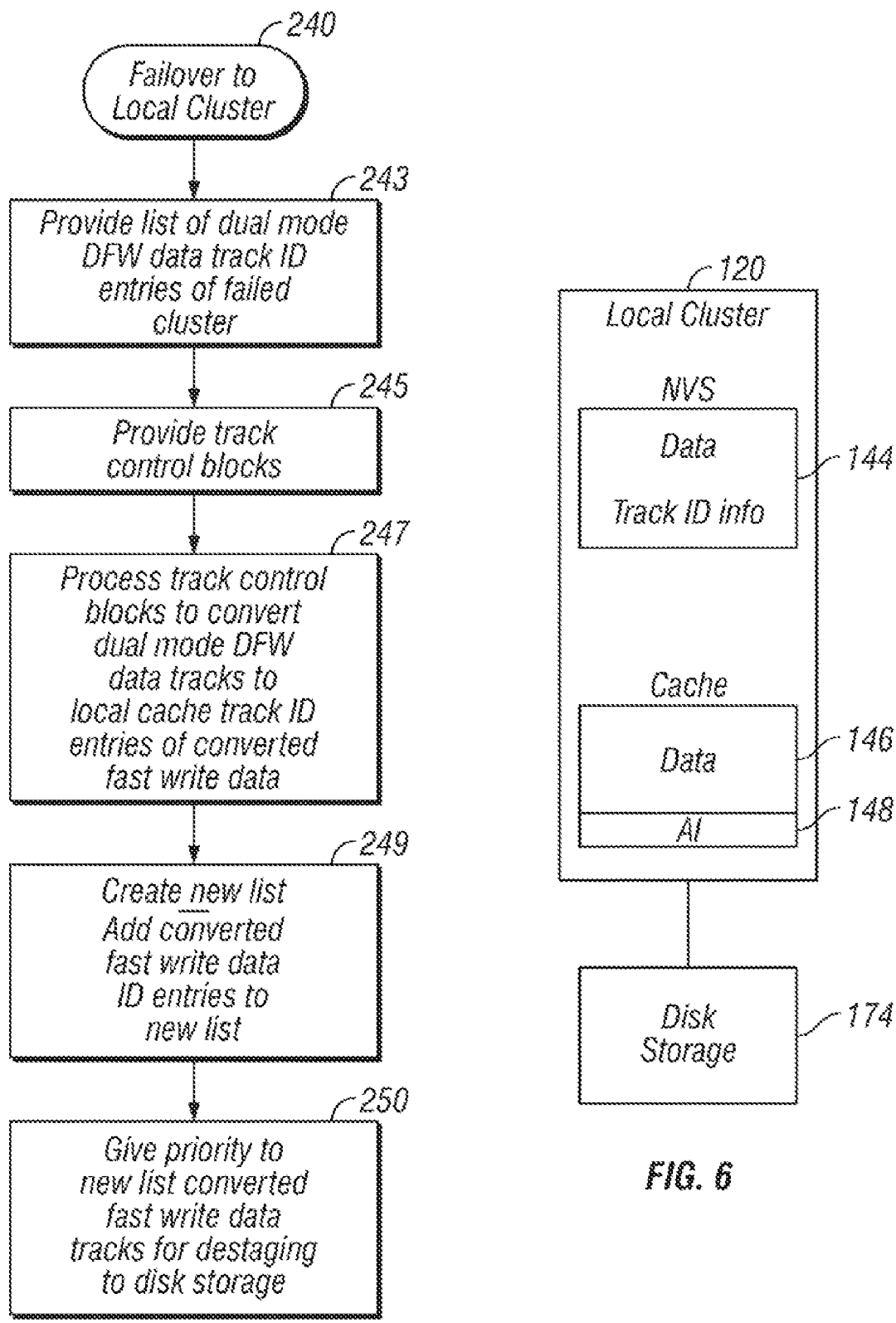
FIG. 5 is a flow chart depicting failover processing in accordance with the present invention.
FIG. 6 is a diagrammatic illustration of the failover process of FIG. 5.

In accordance with the present invention, referring to FIGS. 1, 5 and 6, in response to a failover of one of the pair of clusters to a local cluster in step 240, in one embodiment, the local cluster converts the local cache storage dual mode DASD fast write data to converted fast write data, and gives priority to the converted fast write data over other fast write data for destaging the data to disk storage. In the example, cluster 110 is assumed to have failed, and the failover is to cluster 120. FIG. 6 depicts the non-volatile data storage 144 and cache 146 and adapter interface 148 only, and does not show the subsystem control 142 or other aspects of the cluster, and characterizes the disk storage 170-173 as disk storage 174 which is illustrated as a proxy for disk storage 170-173.

In one embodiment, in step 243, the subsystem control 142 accesses the non-volatile storage 144 to provide the list of dual mode DASD fast write track ID entries of the failed cluster. The list separated from the full list of fast write data provided by NVS 144 as discussed above, and may be provided to the cache 146. In step 245, the storage control operates the NVS 144 to provide track control blocks, e.g., to the cache 146. In step 247, the subsystem control processes the track control blocks to convert the track ID entries of the dual mode DASD fast write data of the failed cluster to local track ID entries of the data, thereby converting the local cache storage dual mode DASD fast write data to converted fast write data. In step 249, the subsystem control creates a new list, such as a LRU (least recently used) list, for the NVS and adds converted fast write data ID entries to the new list. Alternatively, the new list may comprise a FIFO (first in-first out) list. In one embodiment, the subsystem control code for processing the track control blocks and the converted track ID entries resides with a cache control module for cache 146. In alternative embodiments, at least some of the subsystem control code is separate from the processor 142 and cache control 146, and resides with the adapter interface 148. Further, at least some of the subsystem control code may reside with a non-volatile storage control module for the non-volatile storage 144. Thus, in one embodiment, the adapter interface 148 calls the cache control to create the new list for the failover converted fast write data. In step 250, the subsystem control gives priority to the new list of converted fast write data tracks for destaging to disk storage, for example, on the LRU or FIFO basis of the new list. If a converted fast write data track is successfully destaged, the track ID entry in the NVS is removed, and the track is changed to be an un-modified track in cache.

The converted fast write data that is in cache data storage is therefore destaged to the more permanent storage, such as disk storage.

Figure 7:
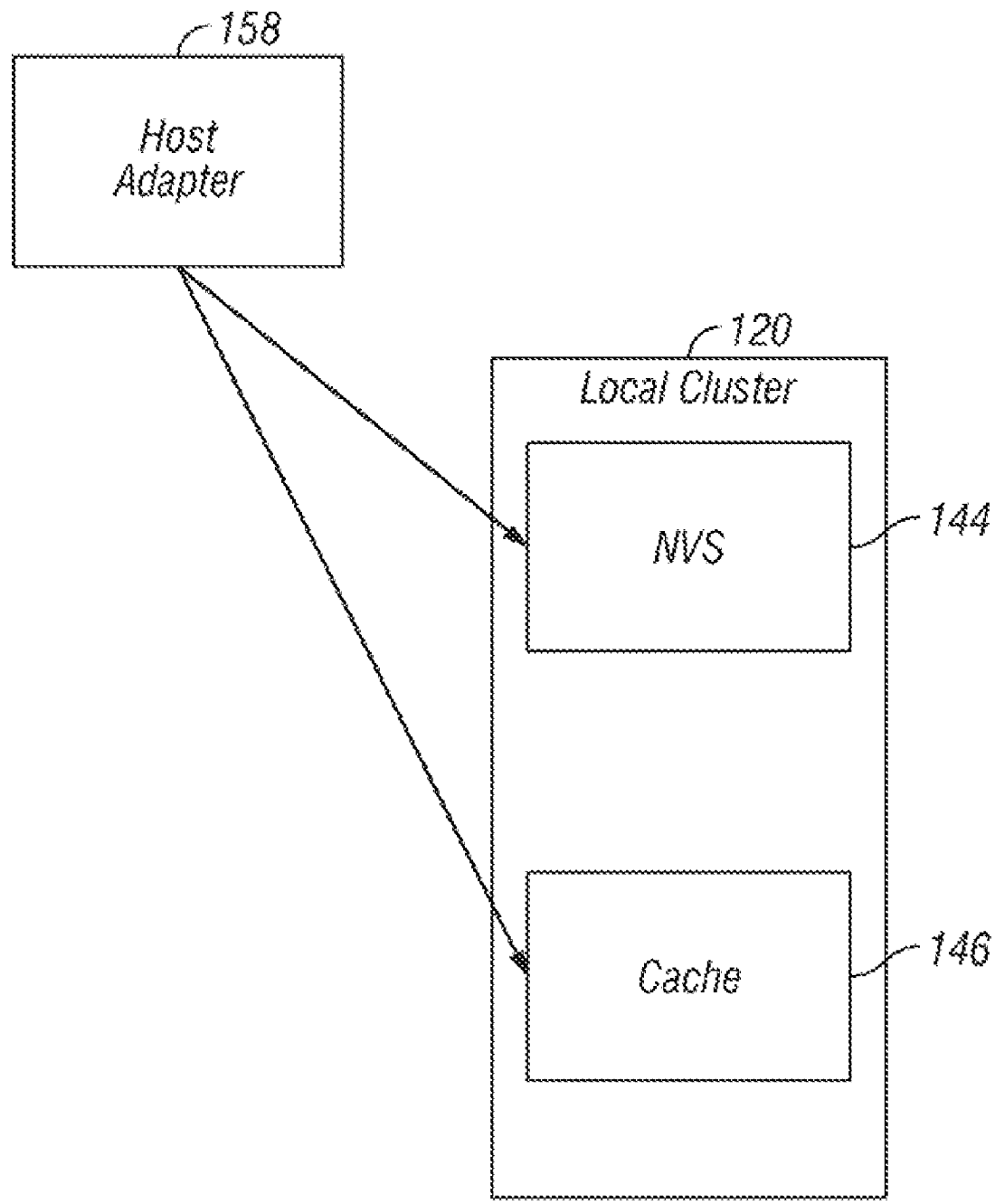
FIG. 7 is a diagrammatic illustration of a prior art process for receiving DASD fast write data in a single cluster mode of the data storage subsystem of FIG. 1.

Referring additionally to FIG. 7, the data storage system may then continue operation as a prior art single mode data storage subsystem, using only the remaining cluster 120, where the host adapter 158 provides DFW data to be destaged to both the NVS 144 and to the cache 146 of the same cluster, and having some degree of safety with one mode of data storage serving as backup to the other.

Normally, the destaging process is conducted quickly, but the data storage system may be experiencing drive, or rank, or device adapter problems that prevent the destaging from succeeding. As the result, the portion of the dual mode DASD fast write data that is stored only in local cache is left vulnerable and is the only copy of the data.

Figure 8:
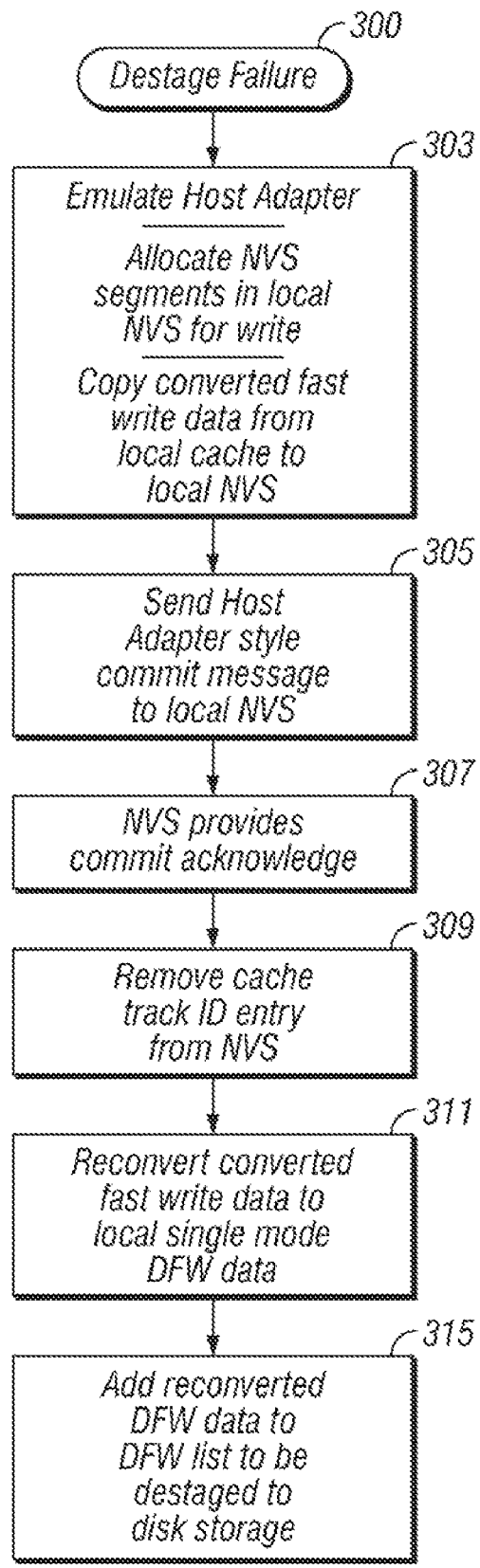
FIG. 8 is a flow chart depicting failover processing in accordance with the present invention upon an inability to destage data to disk storage.

Referring to FIGS. 1, 6 and 8, in accordance with the present invention, in response to a failover of one of the pair of clusters to a local cluster, for example a failover to cluster 120, the cluster is configured to attempt to destage data from the local cache data storage to the disk storage. In response to failure of step 300 to destage the converted fast write data to the disk storage, the cluster allocates local non-volatile storage tracks and emulates a host adapter to provide the converted fast write data of the local cache data storage 146 to the local non-volatile storage 144 for storage by the local non-volatile storage, reconverting the converted fast write data of the local cache data storage to local single mode DASD fast write data stored in the local non-volatile storage and stored in the local cache storage.

In one embodiment, in step 303, the storage control emulates a host adapter, such as host adapter 158, and may also emulate an adapter interface, such as adapter interface 148. The code may be termed "retro-store" control. The storage control, emulating the host adapter, calls the cache or actual adapter interface or emulated adapter interface to access a track or tracks for a DFW write operation, and cache, etc. allocates the NVS segments of the local NVS 144 for the write. For example, the emulated adapter interface code calls cache to lock the cache control block for the track, and the cache interfaces with the NVS to get NVS space allocated for the write. The storage control, for example emulating the adapter interface, may also allocate an NVS track buffer in the local NVS 144. The storage control builds and sends track NVS control block(s) to the local NVS to indicate the segments to use. For example, the cache returns back to the emulated adapter interface code indicating that the space is allocated, the adapter interface code calls the NVS to allocate an NVS track buffer for the write to begin.

The storage control, emulating the host adapter, copies the converted fast write data, above, to the local non-volatile storage 144 for storage by the local non-volatile storage, for example, to the NVS track buffer, above.

In one embodiment, in step 305, the storage control retro-store code, emulating the host adapter, sends a host adapter style commit message to the local NVS, for example sending mail to the local non-volatile store 144 to commit the copied data for the track. In step 307, the local NVS sees the mail, and then commits the copied data, for example, by building an NVS control block for the track and moving the copied data from the NVS track buffer to the NVS segments allocated above. The NVS then sends a commit complete mail message back to the retro-store code, providing the commit acknowledge.

In step 309, the storage control retro-store responds to the commit complete mail message, frees the NVS track buffer, and then calls cache to remove the track ID entry for the cache 146 from the local NVS.

The subsystem control, as discussed above, may take many forms, and is configured to store in the local non-volatile storage, track ID entries of fast write data stored in the local cache data storage; and is additionally configured, in response to a commit acknowledge from the local non-volatile store to the host adapter style commit message, to remove the cache track ID entry from the local non-volatile store for the converted fast write data that has been committed.

In a further embodiment, in step 311, once the track ID entry is removed, the storage control retro-store reconverts the track from a converted fast write data track (discussed above) back to a DASD fast write data track, but now a single mode DASD fast write data track. The storage control, for example, emulating an adapter interface, calls cache to move the track from the new list to a DASD fast write (DFW) track list to be destaged to disk storage when that function is restored.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data storage subsystem configured to store data with respect to at least one host adapter, comprising:
   disk storage configured to store data; and
   a pair of clusters, each comprising:
   local non-volatile data storage;
   local cache data storage; and
   subsystem control configured to store dual mode DASD fast write data of a logical subsystem in said local non-volatile data storage and dual mode DASD fast write data of another logical subsystem in said local cache data storage; and, in response to a failover of one of said pair of clusters to a local cluster, to convert said local cache storage dual mode DASD fast write data to converted fast write data, and to give priority to said converted fast write data over other fast write data for destaging said data to said disk storage.

2. The data storage subsystem of claim 1, wherein said subsystem control of each said cluster is embodied as non-volatile storage control and cache control; said cache control configured to create a new list for said failover converted fast write data, such that said converted fast write data is to be processed with said priority for destaging to said disk storage.

3. The data storage subsystem of claim 2, wherein said subsystem control of each said cluster additionally is configured to store in said local non-volatile storage, track ID entries of said dual mode DASD fast write data of said another logical subsystem stored in said local cache data storage; and, in response to said failover of one of said pair of clusters to a local cluster, to convert said track ID entries of said dual mode DASD fast write data of said failed cluster to local track ID entries of said data, thereby converting said local cache storage dual mode DASD fast write data to converted fast write data; and to add said changed track IDs to said new list.

4. A data storage subsystem configured to store data with respect to at least one host adapter, comprising:
   disk storage configured to store data; and
   a pair of clusters, each comprising:
   local non-volatile data storage;
   local cache data storage; and
   subsystem control configured to store dual mode DASD fast write data of a logical subsystem in said local non-volatile data storage and dual mode DASD fast write data of another logical subsystem in said local cache data storage; and, in response to a failover of one of said pair of clusters to a local cluster, to convert said local cache storage dual mode DASD fast write data to converted fast write data and to attempt to destage said converted fast write data from said local cache data storage to said disk storage, and said subsystem control is configured to, in response to failure to destage said converted fast write data to said disk storage, allocate local non-volatile storage tracks and emulate a host adapter to provide said converted fast write data of said local cache data storage to said local non-volatile storage for storage by said local non-volatile storage, reconverting said converted fast write data of said local cache data storage to local single mode DASD fast write data stored in said local non-volatile storage and stored in said local cache storage.

5. The data storage subsystem of claim 4, wherein said subsystem control of each said cluster is configured to send a host adapter style commit message to said local non-volatile storage to commit said provided converted fast write data.

6. The data storage subsystem of claim 5, wherein said subsystem control of each said cluster is configured to store in said local non-volatile storage, track ID entries of fast write data stored in said local cache data storage; and is additionally configured, in response to a commit acknowledge from said local non-volatile store to said host adapter style commit message, to remove said cache track ID entry from said local non-volatile store for said converted fast write data that has been committed.

7. The data storage subsystem of claim 6, wherein said subsystem control of each said cluster adds said single mode DASD fast write data reconverted from said converted fast write data to a DASD fast write (DFW) list to be destaged to said disk storage.

8. The data storage subsystem of claim 5, wherein said subsystem control of each said cluster is embodied as non-volatile storage control, cache control and retro-store control; said cache control configured to call said non-volatile storage control to allocate non-volatile storage segments for write; and said retro-store control emulating said host adapter.

9. A cluster of a pair of clusters of a data storage subsystem, said data storage subsystem configured to store data with respect to at least one host adapter and a disk storage configured to store data; said cluster comprising a local cluster comprising:
   local non-volatile data storage;
   local cache data storage; and
   subsystem control configured to store dual mode DASD fast write data of a logical subsystem in said local non-volatile data storage and dual mode DASD fast write data of another logical subsystem in said local cache data storage; and, in response to a failover of one of said pair of clusters to said local cluster, to convert said local cache storage dual mode DASD fast write data to converted fast write data, and to give priority to said converted fast write data over other fast write data for destaging said data to said disk storage.

10. The cluster of claim 9, wherein said subsystem control is embodied as non-volatile storage control and cache control; said cache control configured to create a new list for said failover converted fast write data, such that said converted fast write data is to be processed with said priority for destaging to said disk storage.

11. The cluster of claim 10, wherein said subsystem control additionally is configured to store in said local non-volatile storage, track ID entries of said dual mode DASD fast write data of said one logical subsystem stored in said local cache data storage; and, in response to said failover of another of said pair of clusters to said local cluster, to convert said track ID entries of said dual mode DASD fast write data of said failed cluster to local track ID entries of said data, thereby converting said local cache storage dual mode DASD fast write data to converted fast write data; and to add said changed track IDs to said new list.

12. A cluster of a pair of clusters of a data storage subsystem, said data storage subsystem configured to store data with respect to at least one host adapter and a disk storage configured to store data; said cluster comprising a local cluster comprising:
   local non-volatile data storage;
   local cache data storage; and
   subsystem control configured to store DASD fast write data of a logical subsystem in said local non-volatile data storage and DASD fast write data of another logical subsystem in said local cache data storage; and, in response to a failover of one of said pair of clusters to said local cluster, to convert said local cache storage dual mode DASD fast write data to converted fast write data and to attempt to destage data from said local cache data storage to said disk storage, and said subsystem control is configured to, in response to failure to destage said converted fast write data to said disk storage, allocate local non-volatile storage tracks and emulate a host adapter to provide said converted fast write data to said local non-volatile storage for storage by said local non-volatile storage, reconverting said converted fast write data of said non-volatile storage to local DASD fast write data stored in said local non-volatile storage and stored in said local cache storage.

13. The cluster of claim 12, wherein said subsystem control is configured to send a host adapter style commit message to said local non-volatile storage to commit said provided converted fast write data.

14. The cluster of claim 13, wherein said subsystem control is configured to store in said local non-volatile storage, track ID entries of fast write data stored in said local cache data storage; and is additionally configured, in response to a commit acknowledge from said local non-volatile store to said host adapter style commit message, to remove said cache track ID entry from said local non-volatile store for said converted fast write data that has been committed.

15. The cluster of claim 14, wherein said subsystem control adds said DASD fast write data reconverted from said converted fast write data to a DASD fast write (DFW) list to be destaged to said disk storage.

16. The cluster of claim 13, wherein said subsystem control is embodied as non-volatile storage control, cache control and retro-store control; said cache control configured to call said non-volatile storage control to allocate non-volatile storage segments for write; and said retro-store control emulating said host adapter.

17. A method for operating a local cluster of a pair of clusters comprising a data storage subsystem, said data storage subsystem configured to store data with respect to at least one host adapter and comprising disk storage configured to store data; said cluster comprising local non-volatile data storage; local cache data storage; and subsystem control; said method comprising the steps of:
storing DASD fast write data of a logical subsystem in said local non-volatile data storage and storing DASD fast write data of another logical subsystem in said local cache data storage;
in response to a failover of one of said pair of clusters to said local cluster, converting said local cache storage DASD fast write data to converted fast write data; and
in response to failure to destage said converted fast write data to said disk storage, allocating local non-volatile storage tracks and emulating a host adapter to provide said converted fast write data to said local non-volatile storage for storage by said local non-volatile storage, thereby reconverting said converted fast write data of said non-volatile storage to local DASD fast write data stored in said local non-volatile storage and stored in said local cache storage.

18. The method of claim 17, comprising the step of creating a new list for said failover converted fast write data, such that said converted fast write data is to be processed with said priority for destaging to said disk storage.

19. The method of claim 18, comprising the steps of:
storing in said local non-volatile storage, track ID entries of said dual mode DASD fast write data of said another logical subsystem stored in said local cache data storage;
in response to said failover of one of said pair of clusters to a local cluster, converting said track ID entries of said dual mode DASD fast write data of said failed cluster to local track ID entries of said data, thereby converting said local cache storage dual mode DASD fast write data to converted fast write data; and
adding said changed track IDs to said new list.

20. The method of claim 17, additionally comprising the step of sending a host adapter style commit message to said local non-volatile storage to commit said provided converted fast write data.

21. The method of claim 20, wherein said subsystem control is configured to store in said local non-volatile storage, track ID entries of fast write data stored in said local cache data storage; and said method additionally comprises the step of:
in response to a commit acknowledge from said local non-volatile store to said host adapter style commit message, removing said cache track ID entry from said local non-volatile store for said converted fast write data that has been committed.

22. The method of claim 21, additionally comprising the step of:
adding said DASD fast write data reconverted from said converted fast write data to a DASD fast write (DFW) list to be destaged to said disk storage.

23. The method of claim 20, wherein said step of allocating local non-volatile storage tracks and emulating a host adapter comprises:
calling said non-volatile storage to allocate non-volatile storage segments for write, and emulating said host adapter to copy said converted fast write data from said local cache storage to said allocated non-volatile storage segments.

24. A computer program product comprising a computer useable medium having computer useable program code tangibly embodied therein for operating a local cluster of a pair of clusters comprising a data storage subsystem, said data storage subsystem configured to store data with respect to at least one host adapter and comprising disk storage configured to store data; said local cluster comprising local non-volatile data storage; local cache data storage; and subsystem control, said subsystem control storing DASD fast write data of a logical subsystem in said local non-volatile data storage and storing DASD fast write data of another logical subsystem in said local cache data storage; said computer useable program code configured to, when executed on said subsystem control, cause said subsystem control to:
in response to a failover of one of said pair of clusters to said local cluster, convert said local cache storage DASD fast write data to converted fast write data; and
in response to failure to destage said converted fast write data to said disk storage, allocate local non-volatile storage tracks and emulate a host adapter to provide said converted fast write data to said local non-volatile storage for storage by said local non-volatile storage, thereby reconverting said converted fast write data of said non-volatile storage to local DASD fast write data stored in said local non-volatile storage and stored in said local cache storage.

25. The computer program product of claim 24, wherein said computer useable program code is additionally configured to, when executed on said subsystem control, cause said subsystem control to create a new list for said failover converted fast write data, such that said converted fast write data is to be processed with said priority for destaging to said disk storage.

26. The computer program product of claim 25, wherein said computer useable program code is additionally configured to, when executed on said subsystem control, cause said subsystem control to:
store in said local non-volatile storage, track ID entries of said dual mode DASD fast write data of said another logical subsystem stored in said local cache data storage;
in response to said failover of one of said pair of clusters to a local cluster, convert said track ID entries of said dual mode DASD fast write data of said failed cluster to local track ID entries of said data, thereby converting said local cache storage dual mode DASD fast write data to converted fast write data; and
add said changed track IDs to said new list.

27. The computer program product of claim 24, wherein said computer useable program code is additionally configured to, when executed on said subsystem control, cause said subsystem control to send a host adapter style commit message to said local non-volatile storage to commit said provided converted fast write data.

28. The computer program product of claim 27, wherein said subsystem control is configured to store in said local non-volatile storage, track ID entries of fast write data stored in said local cache data storage; and said computer useable program code is additionally configured to, when executed on said subsystem control, cause said subsystem control to:

in response to a commit acknowledge from said local non-volatile storage to said host adapter style commit message, remove said cache track ID entry from said local non-volatile storage for said converted fast write data that has been committed.

29. The computer program product of claim 28, wherein computer useable program code is additionally configured to, when executed on said subsystem control, cause said subsystem control to:

add said DASD fast write data reconverted from said converted fast write data to a DASD fast write (DFW) list to be destaged to said disk storage.

30. The computer program product claim 27, wherein said computer useable program code configured to, in causing said subsystem control to allocate local non-volatile storage tracks and emulate a host adapter, causes said subsystem control to:

call said non-volatile storage to allocate non-volatile storage segments for write, and emulate said host adapter to copy said converted fast write data from said local cache data storage to said allocated non-volatile storage segments.

* * * * *